Oct. 24, 1967     W. G. SCHWARZ     3,349,234
ILLUMINATING APPARATUS

Filed June 1, 1965     2 Sheets-Sheet 1

INVENTOR.
WILLIAM G. SCHWARZ

BY Roger W. Jensen
ATTORNEY

INVENTOR.
WILLIAM G. SCHWARZ

United States Patent Office 3,349,234
Patented Oct. 24, 1967

3,349,234
ILLUMINATING APPARATUS
William G. Schwarz, Columbia Heights, Minn., assignor to Honeywell Inc., Minneapolis, Minn., a corporation of Delaware
Filed June 1, 1965, Ser. No. 460,050
1 Claim. (Cl. 240—2.1)

ABSTRACT OF THE DISCLOSURE

Instrument illuminating apparatus using a curved transparent wedge in front of the instrument. Light enters the wide end of the wedge and travels through the wedge to the instrument by internal reflection. A second curved transparent wedge traps glare light coming out of the front of the first wedge.

---

The invention described herein was made in the performance of work under a NASA contract and is subject to the provisions of Section 305 of the National Aeronautics and Space Act of 1958. Public Law 85–568 (72 Stat. 435; 42 U.S.C. 2457).

The present invention pertains generally to illuminating devices and more particularly to unique and novel apparatus to distribute light evenly over a curved surface. Although my invention is described herein with reference to the illumination of a curved dial face, it should be understood that the principles and techniques disclosed may be equally well applied to the homogeneous lighting of any curved surface.

Various methods have been employed in the prior art for the purpose of lighting a curved dial face including direct lighting and back lighting. Direct lighting is undesirable because it is difficult to position a light source so as to evenly illuminate the various portions of a curved dial face. In order to provide even illumination it is necessary to remove the light source to such a distance that the indicator device utilizing the curved dial face cannot be made compactly. In this type of system the dial face is constructed of a translucent material and is illuminated from behind so that the entire dial face appears to glow. However, this requires that a light source be positioned behind the dial face where the apparatus to actuate the dials is positioned which necessitates a crowded condition and makes replacement of the light source difficult. Also, moving elements such as pointers in front of the translucent dial face are rather difficult to light with back lighting.

The present invention contemplates a separate but compact illuminating system which spreads light evenly over a curved dial face including the pointers without interfering with the mechanism of the indicator itself. Briefly, a wedge of clear transparent material is formed so as to curve about the curved dial face and remain substantially equidistant from the dial face. A compact small light source is utilized to project light into the wide end of the wedge where it is internally reflected numerous times emerging everywhere from the wedge onto the dial face. Since a wedge of this configuration tends to allow a great deal of the internally reflected light to escape outward toward the viewer, a second curved wedge is used to trap this outgoing light and divert it so as to prevent glare.

Accordingly, it is an object of the present invention to provide apparatus for compactly and efficiently illuminating a curved indicator surface while remaining physically separate from the indicating mechanism. Further objects and advantages will be apparent from the following description and drawings in which.

Figure 1:
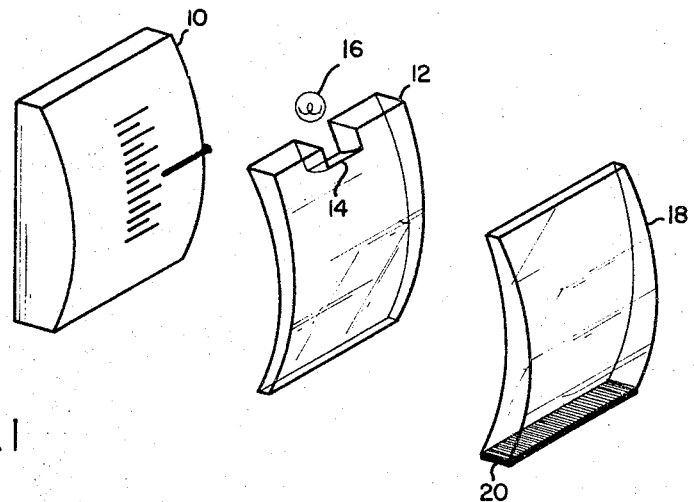
FIGURE 1 is an exploded view of a dial face, curved wedges and light source of the present invention.

With reference to FIGURE 1 a cylindrically curved convex dial face or indicator 10 is shown, which, for the purposes of this application is to be illuminated. A curved glass wedge 12 is designed to generally conform to the curved face of indicator 10. Curved wedge 12 has a notch 14 formed therein to accommodate a light source 16. Light from light source 16 is distributed throughout wedge 12 and emerges on both sides of wedge 12 so as to illuminate indicator 10. In order to prevent the light emerging from the convex side of wedge 12 from causing glare a second curved glass wedge 18 is positioned proximate to wedge 12 so as to operate as a light trap. Light emerging from the convex side of wedge 12 enters the concave side of wedge 18 where it is internally reflected a plurality of times until it reaches the bottom of wedge 18 where the light is absorbed by a light absorbing strip 20. Light absorbing strip 20 may be any suitable paint or substance which will absorb internally reflected light so as to prevent the light from being again reflected and emerging as glare. Wedges 12 and 18 may be constructed of glass or plastic or any other substance which is suitably transparent. The design and shape of the apparatus of FIGURE 1 may be more clearly understood by reference to FIGURE 2.

Figure 2:
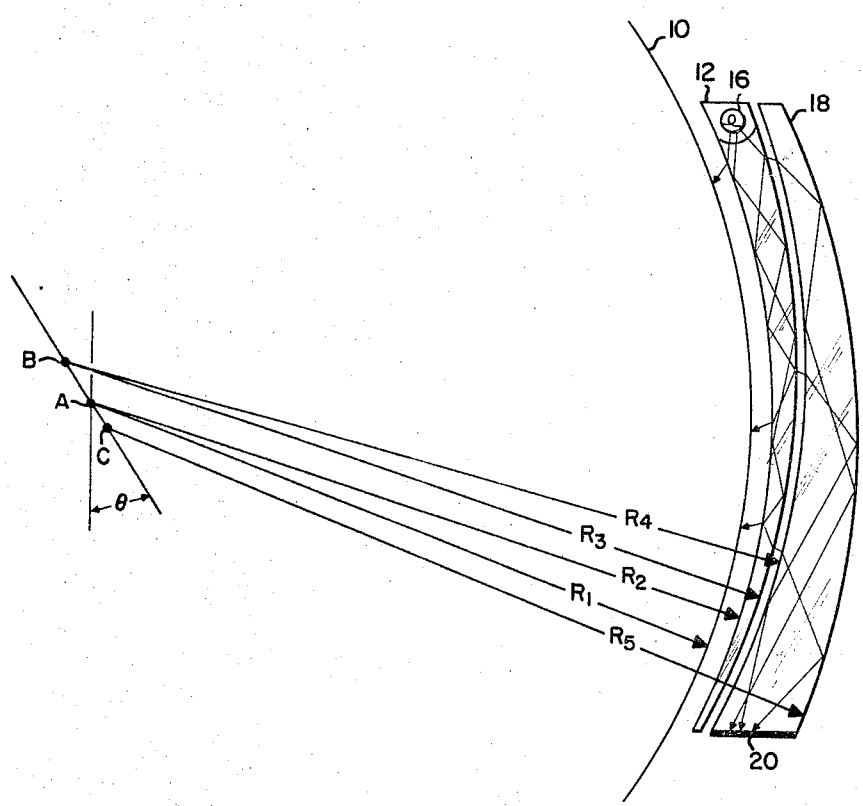
FIGURE 2 is a schematic drawing to illustrate the principles of operation of my invention.

In FIGURE 2 the convex curved indicator surface 10 and wedges 12 and 18 are schematically shown so as to demonstrate the principles of operation of the present invention. Each of the curved surfaces in FIGURE 2 is shown as a circular cylindrical surface with a radius of curvature about a given point. The reason for this is that cylindrical surfaces of this type are easier to machine and, thus, wedges constructed in this manner are somewhat more simple to produce. It should be understood, however, that the present invention is not limited to the use of cylindrical surfaces but may work equally well with non-cylindrical surfaces. In FIGURE 2 curved surface 10 and the concave side of wedge 12 are defined by a pair of radii $R_1$ and $R_2$ about a point A. In order to form a wedge the convex side of wedge 12 and the concave side of wedge 18 are defined by a pair of radii $R_3$ and $R_4$ about a second point B.

As can be seen in FIGURE 2 light source 16 directs light in a plurality of directions within the top of light distribution wedge 12. The light that strikes the inside surfaces of wedge 12 at angles greater than the critical angle reflect on down through the wedge. However, as wedge 12 tapers, the light rays are presented with ever steepening angles until finally they reach the critical angle, whereupon they emerge from light distribution wedge 12 to illuminate curved surface 10. The light that leaves the convex side of wedge 12 enters the light trap wedge 18 where it is channeled downward by a series of reflections into a strip of light absorbing material 20. It is desirable to have the convex side of light trap wedge 18 curve out far enough so that all of the light impinging thereon will strike at an angle less than the critical angle. In this way no light will emerge from wedge 18 as glare. To accomplish this, the convex side of wedge 18 is defined by a radius $R_5$ about yet a third point C. Thus, the only light that passes through wedges 12 and 18 to the viewer is that illuminating light which is reflected off of surface 10 and travels substantially horizontally through the two wedges. One possible set of dimensions which have been found to work well in the preferred embodiment of FIGURE 2 are the following:

| | | |
|---|---|---|
| $R_1$ | units | 2.970 |
| $R_2$ | do | 3.050 |
| $R_3$ | do | 3.290 |
| $R_4$ | do | 3.300 |
| $R_5$ | do | 3.380 |
| $\theta$ | degrees | 25 |
| Distance AB | units | .250 |
| Distance AC | do | .125 |

Although the foregoing dimensions have been applied successfully they are merely exemplary and should not be construed as limiting the invention. Wide variations from the figures shown may be had and, in fact, it is not even necessary that a constant radius be employed since any substantially cylindrical surface will do as well.

Figure 3:
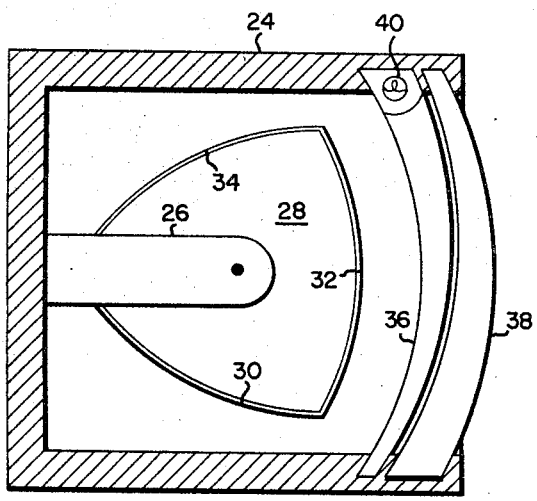
FIGURE 3 is a schematic drawing showing one preferred embodiment of my invention.

In FIGURE 3 apparatus is shown demonstrating one way in which my invention may be utilized in an operable configuration. A housing 24 contains a support member 26 which member carries a rotating dial mechanism 28. Dial mechanism 28 has a group of three curved dial faces 30, 32, and 34. In the position shown, dial face 32 is presented for viewing. In order to evenly illuminate this surface 32 a light distribution wedge 36 and a light trap wedge 38 are mounted into housing 24. As described with reference to FIGURE 2, a light source 40 propagates light down through wedge 36 and onto surface 32. The distance between wedge 36 and wedge 38 should be large enough so as to insure an air gap.

If desired the rate of taper of the wedges may be altered or the thickness of the wedge may be altered, both of these modifications resulting in variations in the intensity of illumination over the surface 32. Various other modifications and variations may be made to the apparatus disclosed without departing from the spirit and scope of the present invention. Therefore, I do not intend to be limited to the embodiments shown except as defined by the appended claim.

I claim:

Apparatus for illuminating a curved surface comprising:

a curved light distribution wedge positioned substantially parallel to the curved surface, said light distribution wedge being formed of a transparent material and having two cylindrical surfaces thereon, the center of curvature of said two cylindrical surfaces being separated;

a source of light positioned proximate to the thick portion of said light distribution wedge so as to project light into the light distribution wedge; and a curved light trap wedge positioned substantially parallel to said light distribution wedge so as to internally reflect light emitted from the convex side of the light distribution wedge toward the base of said curved light trap wedge, said light trap wedge being formed of a transparent material and having two cylindrical surfaces thereon, the centers of curvature of said two cylindrical surfaces being separated, the thin portion of said light trap wedge being adjacent the thick portion of said light distribution wedge.

References Cited
UNITED STATES PATENTS

| | | | |
|---|---|---|---|
| 2,761,056 | 8/1956 | Laso | 240—2.1 |
| 3,029,334 | 4/1962 | Anderson et al. | |
| 3,040,168 | 6/1962 | Stearns. | |
| 3,246,133 | 4/1966 | Hensleigh | 240—2.1 |

NORTON ANSHER, *Primary Examiner.*

DAVID L. JACOBSON, *Assistant Examiner.*